Dec. 21, 1943. W. O. SCHULTZ ET AL Re. 22,412

COMBINED SWITCH AND FUSE

Original Filed July 13, 1932 4 Sheets-Sheet 1

Inventors
William O. Schultz
By Alwin G. Steinmayer
Arthur R. Woolson Attorney

Dec. 21, 1943. W. O. SCHULTZ ET AL Re. 22,412

COMBINED SWITCH AND FUSE

Original Filed July 13, 1932 4 Sheets-Sheet 2

Inventors

William O. Schultz

By Alvin G. Steinmayer

Arthur R. Woolfolk Attorney

Dec. 21, 1943. W. O. SCHULTZ ET AL Re. 22,412

COMBINED SWITCH AND FUSE

Original Filed July 13, 1932 4 Sheets-Sheet 3

Inventors
William O. Schultz
Alvin G. Steinmayer
Arthur R. Thorpe Attorney

Dec. 21, 1943. W. O. SCHULTZ ET AL Re. 22,412

COMBINED SWITCH AND FUSE

Original Filed July 13, 1932 4 Sheets-Sheet 4

Inventors
William O. Schultz
Alwin G. Steinmayer
By
Arthur P. Woodfolk Attorney

Reissued Dec. 21, 1943 Re. 22,412

UNITED STATES PATENT OFFICE 22,412

COMBINED SWITCH AND FUSE

William O. Schultz, South Milwaukee, and Alwin G. Steinmayer, Shorewood, Wis., assignors to Line Material Company, South Milwaukee, Wis., a corporation of Delaware Original No. 2,176,227, dated October 17, 1939, Serial No. 622,292, July 13, 1932. Application for reissue August 30, 1943, Serial No. 500,574

39 Claims. (Cl. 200—114)

This invention relates to a combined switch and fuse.

In fuse constructions as heretofore made for use in the protection of high voltage lines it has been the practice heretofore to provide some means in certain forms of these fuses for allowing the fuse to rock outwardly after the fuse link has been ruptured, to thereby increase the separation between the live side of the line and the fuse structure.

These devices have heretofore been made either in the form of a stick type of circuit breaker, which requires a relatively large swing, or in other types of fuses in which the fuse is located within the tube open to the weather at the top.

In view of the fact that fiber is the usual, and, in fact, a very highly serviceable material for the construction of the inner portion at least of fuse tubes, it has been found that devices of this nature collect water and the fiber, as is well known, absorbs the water in considerable quantity causing warping and other defects which renders the fuse unserviceable and inoperative.

This invention is designed to overcome the above noted defects, and objects of this invention are to provide a combined switch and fuse which is so made that although a fuse tube is used and is so constructed that it swings outwardly to provide the maximum space between the live portion of the line and the remainder of the fuse upon rupturing of the fuse link, nevertheless is protected from the collection of water within the tube, so that although a fiber tube or at least a fiber lined tube may be employed, nevertheless warping and distortion and other incident defects due to the collection of water is wholly avoided.

Further objects are to provide a fuse which is so made that one end automatically moves outwardly a considerable distance from the live side of the line and prevents leakage after the fuse link has ruptured, and which although it swings through a considerable arc, nevertheless is cushioned at the lower portion of its swing so that excessive forces or jars and excessive strains are not imposed upon the structure, and which also is so made that it may be readily re-fused and replaced and may be removed or repositioned by means of an ordinary fuse stick or switch stick, the construction also providing an operating ring or member adapted to be engaged by the fuse stick when it is desired to use the device as a disconnecting switch.

Further objects are to provide a fuse construction in which a fuse tube houses the major portion of a fuse link, the lower end of the fuse link being clamped to an auxiliary pivoted member which pivotally supports the fuse, and which when the fuse link blows, permits the fuse to drop downwardly, thereby detaching the upper end of the fuse and allowing the fuse structure to swing outwardly, and to so construct the device that a direct spring contact connection is provided between the auxiliary pivoted member or link receiving member and the lower contact, a similar direct connection by means of a spring contact being provided between the upper contact of the fuse and the upper contact member, provision also being made for the protection of the upper and lower portions of the mechanism from the effects of sleet.

Further objects are to provide a novel form of combined fuse and switch which is compact, which is easy to produce, which is reliable in operation, and which may be readily re-fused, removed or replaced, as occasion demands.

Embodiments of the invention are shown in the accompanying drawings, in which.

Figure 1:
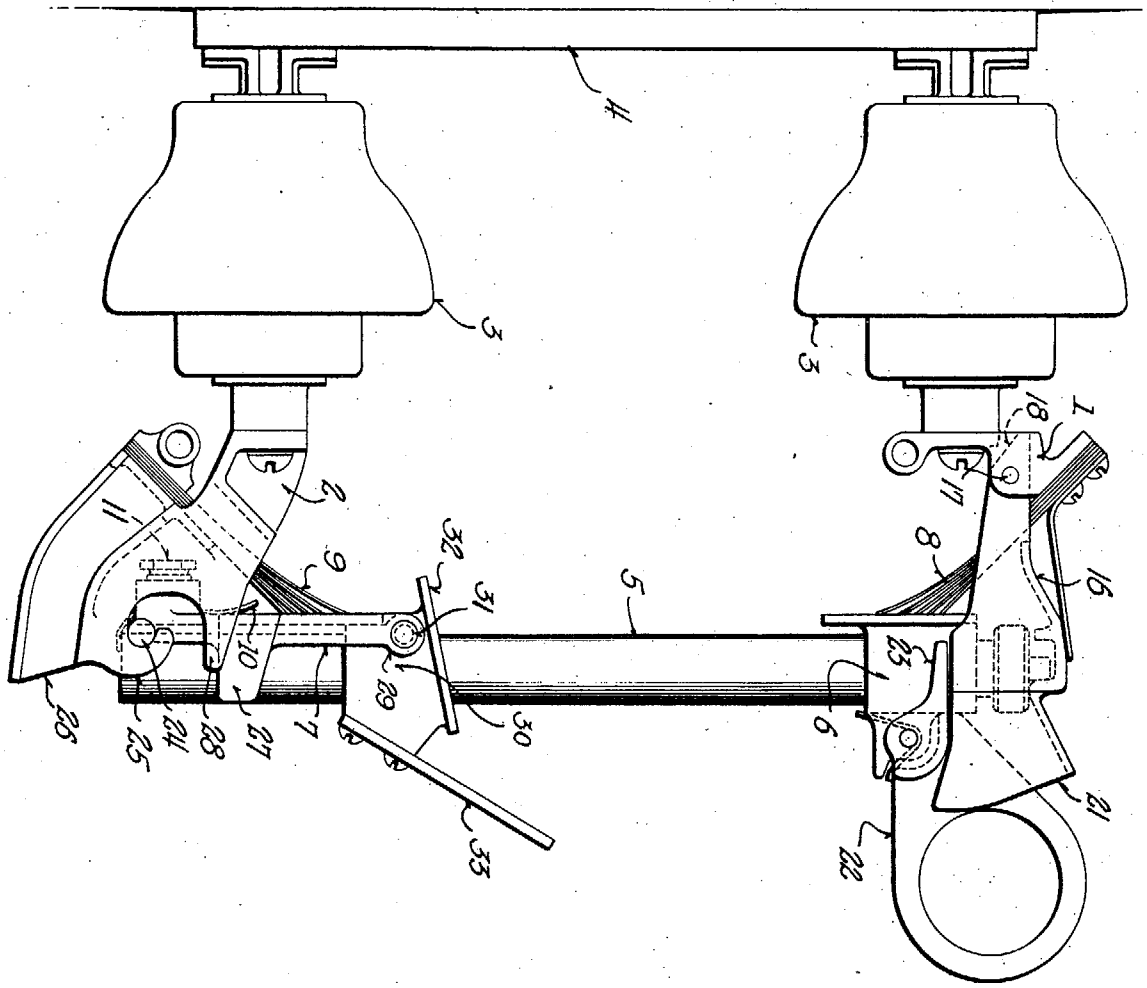
Figure 1 is a side elevation of one form of the device.
Figure 2:
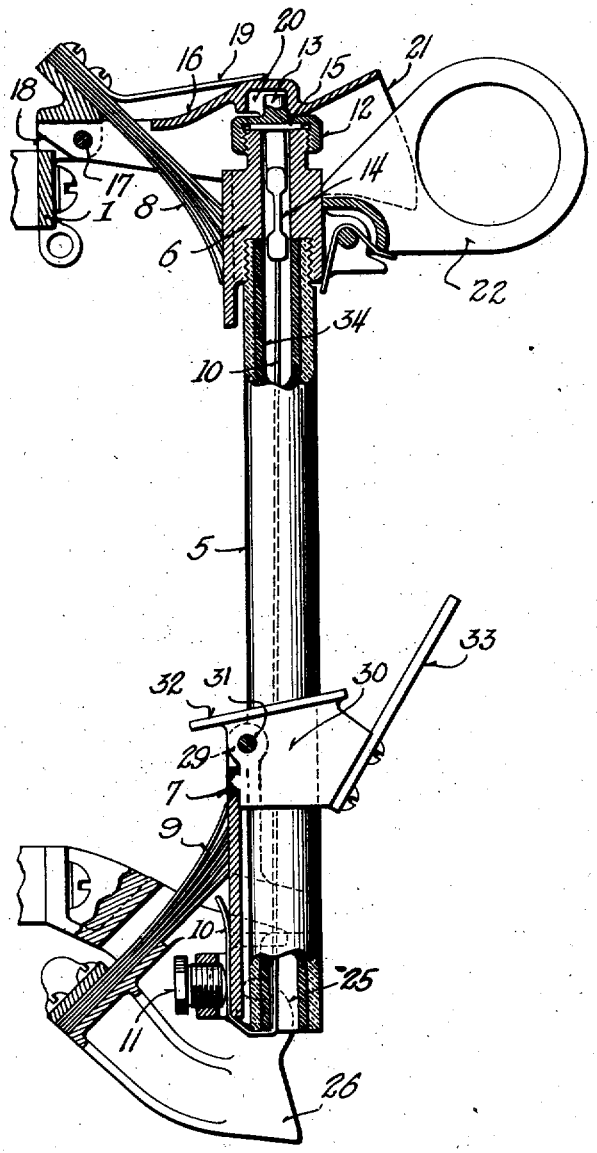
Figure 2 is a view, partly in section, of the structure shown in Figure 1.
Figure 3:
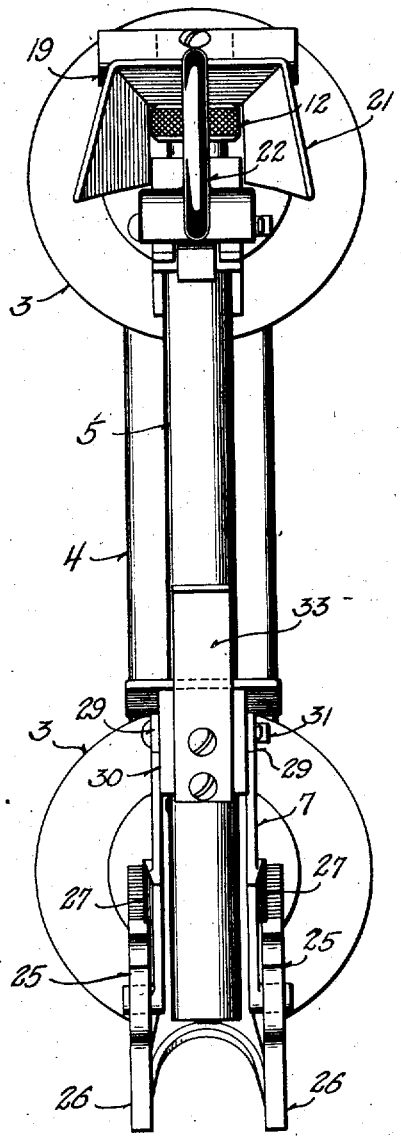
Figure 3 is a front view of the structure shown in Figure 1.

Referring to Figures 1, 2 and 3, it will be seen that the fuse is carried from an upper terminal member 1 and a lower terminal member 2 carried by suitable insulators 3 from a base member 4. The fuse tube 5 is provided with an upper contact 6 and a lower contact or fuse strip receiving member 7. The members 6 and 7 are provided with flat faces against which the contact springs 8 and 9 bear when the fuse is in its operative position, as shown on the drawings.

The member 7 is provided with a slotted portion adapted to receive the free end of the fuse link 10, and is provided with a clamping screw or bolt 11 in the usual manner so as to permit ready renewal of the fuse link.

This construction is most clearly shown in Figure 2, from which it will be seen that the fuse link 10 extends downwardly through the fuse tube around its bottom edge and is thereafter clamped to the member 7, thereby constituting the device an expulsion fuse. The fuse tube 5 is open at its lower end, and at its upper end is provided with the upper contact 6 closed by a removable screw threaded cap 12 provided with a projecting upper pin 13.

The fuse link 10 is provided with a reduced portion 14 adjacent its upper end and with a clip or disk 15 at its upper end adapted to be clamped between the cap 12 and the upper contact 6.

The upper contact member 1 carries a retaining member in the form of a sleet hood 16 pivoted, as indicated at 17, to the upper terminal member. This sleet hood is provided with rearwardly projecting ears 18, see Figure 1, which form stops to arrest its downward motion. It is urged downwardly by means of a leaf spring 19.

The sleet hood or upper latching or retaining member is provided with a recess 20 which normally receives the projecting stem or pin 13 of the cap 12, as shown in Figures 1 and 2. The outer end of the combined upper latching member and sleet hood is provided with a flared portion 21, as shown most clearly in Figure 3, to facilitate the entrance of the upper contact and the adjacent portions.

The upper contact 6 pivotally carries an operating ring or releasing member 22 which is spring urged into the position shown in Figure 1. This operating ring has a forked inner portion, thereby providing arms 23 located below the latching sleet hood or latching member, so that when the ring is pulled downwardly by a switch rod or switch hook, the arms 23 move upwardly and thereby release the fuse and allow it to swing outwardly and downwardly about its pivoted lower end. This allows the device to be used as a disconnecting switch.

The lower member 7 is provided with trunnions or pivot portions 24 which fit within the spaced hooked arms 25 of the lower terminal member 2. The lower portion of the lower terminal member, which forms a continuation of the hooked arms 25, is continued downwardly, as indicated at 26, and it is preferable to have these arms slightly converge towards their inner ends, as indicated in Figure 3, so as to receive the tapered or wedge-shaped extensions 27 of the member 7 when the fuse swings downwardly through approximately 180° from its position shown in Figure 1.

This construction prevents an abrupt shock or blow from the relatively heavy swinging mass, but instead cushions the device, as it provides a sliding wedge contact between the arms 26 and the wedge members 27. The members 26 as well as the arms 27 will slightly yield to enhance the cushioning action.

The hooked arms 25 are so formed that the trunnions or pivots 24 may be readily positioned or removed therefrom through the curved slot located between the extensions 28 and the arms 25, see Figure 1.

The upper portion of the member 7 is bifurcated and has projecting ears or arms 29 located on opposite sides of a metal member 30 rigidly attached to the fuse tube 5.

The member 30 is provided with a plate-like extension 32 projecting therefrom and overhanging the lower contact member of the fuse to thereby constitute a sleet hood to protect the lower parts from sleet.

Further, if desired, the member 30 may be provided with a projecting lip 33 so that it can be received in the slot of a fuse pole in the usual manner when it is desired to replace or remove the fuse.

The operation of the device is as follows:

When an overload occurs, the fuse link ruptures at its reduced portion 14, see Figure 2, and blows the fuse link forcibly from the fuse tube 5, thereby releasing the member 7 or lower contact member which had been held tightly in place by the fuse link itself, as is apparant from an examination of Figure 2. The member 7 is now permitted to rock about its lower pivot pins 24 and also about the upper pivot pins 31, thereby dropping the fuse downwardly a sufficient distance to disengage the pin 13, see Figures 1 and 2, at the upper end of the fuse from the upper latch or sleet hood. This, therefore, disconnects the fuse from the upper contact and allows the fuse to bodily swing about its lower end through approximately 180°. As previously stated, the fuse is cushioned at the lower end of its swing so that there is no severe shock imposed upon any of the parts.

It is to be noted also that the springs 8 and 9, see Figures 1 and 2, aid in the positive starting of the fuse after expulsion of the fuse link, as they press the fuse outwardly. This, therefore, materially aids in a positive action of the device.

It is apparent, therefore, that the fuse first operates as an expulsion fuse and thereby automatically releases itself and drops downwardly and swings completely away from the upper or live contact, giving maximum separation of the parts and preventing any possible chance of leakage or other disturbances of this type.

The fact that the fuse tube is closed at its upper end has the advantage that a distinct expulsion action occurs and has the further advantage that a distinct recoil of the fuse tube or fuse cartridge occurs. For instance, when a heavy short circuit occurs, the recoil tends to hold the fuse tube contacts tightly in engagement with the stationary contacts until the expulsive action of the fuse has cleared the circuit. By this time the effect of the recoil is over and the device drops open. On more limited overload conditions the recoil is not so severe, but nevertheless the device functions in exactly the same way as described above and insures just sufficient time delay to prevent breaking of the circuit at the contacts before the expulsive action has had sufficient time to clear the circuit. Under both conditions, the circuit is broken by a true expulsion action and the device is automatically held closed by this expulsion action until the circuit is cleared, thereby avoiding arcing at the contacts.

Further, in this particular form of the invention, the pivot point 31 is located upon the inner side of the tube and increases its distance of travel and the time delay before the contact at the upper end of the device is broken.

It is to be noted particularly that the expulsion fuse is open at its lower end so that water cannot collect in the fuse tube. It is securely closed at its upper end by the contact cap 12, see Figure 2, so that water cannot enter the upper end of the fuse.

It is thus possible to use a fiber or similarly lined tube with the assurance that the fiber will not be water soaked and consequently will not warp the structure out of shape and prevent its free and easy operation.

It is to be noted from Figure 2 that the fuse tube is lined with fiber, indicated by the reference character 34. The fuse tube, therefore, constitutes a composite structure with an exterior or outer portion formed of phenol condensate product, commonly known as "Bakelite," or other suitable material, and an inner portion formed of fiber or similar material which resists the terrific heat generated by the arc at the time the fuse melts.

Figure 4:
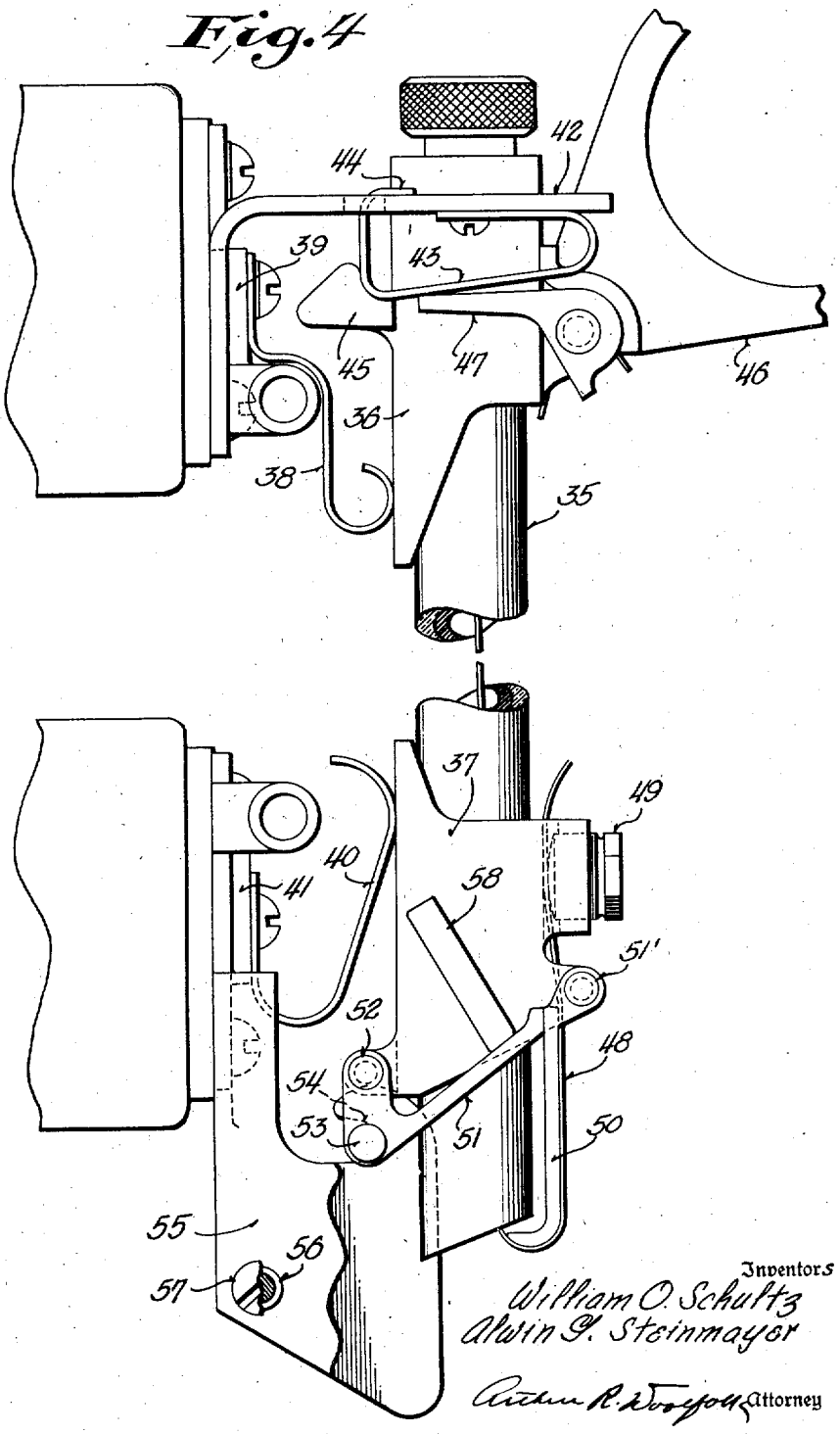
Figure 4 is a view, with parts broken away, of a modified form of the invention.

Referring to Figure 4 wherein another form of the invention is disclosed, it will be seen that the fuse tube 35 carries an upper contact member 36 and a lower contact member 37. The upper contact member is engaged by a contact spring 38 carried by the upper terminal member 39, and the lower contact member 37 is similarly engaged by a contact spring 40 carried by the lower terminal member 41.

The upper terminal member 39 is provided with a pair of outwardly projecting arms 42 between which the upper contact 36 of the fuse is normally positioned. Each of the arms 42 is provided with a latching spring 43 secured thereto and extending upwardly through an aperture in its corresponding arm, so that the inwardly turned portion 44 of the spring will act as a stop to limit its downward motion. The springs 43 normally engage lugs 45 integral with the upper contact 36 and thus retain the fuse in position.

However, the fuse may be readily released when it is to be used as a disconnecting switch by pulling downwardly on the operating ring 46, such ring being connected to a pair of arms 47 which press the springs 43 upwardly and thus release the lugs 45, permitting the fuse to swing outwardly.

The lower contact 37 is slotted and receives the free end of the fuse link 48, such fuse link being locked in place by means of the screw or bolt 49 in a manner corresponding to that previously described.

The lower loop of the fuse link 48 passes around the rounded lower end of a latching lever 50, which is pivoted, as indicated at 51', to the lower contact 37. This lever 50 bears against the free end of a bell crank lever 51 which is pivoted to the lower contact 37, as indicated at 52. This lever 51 is duplicated on opposite sides of the fuse and each of the levers 51 is provided with outwardly projecting trunnions or pivot pins 53 which seat within the slots 54 formed in the side plates 55. The side plates 55 are folded outwardly from the terminal member, as shown in Figure 4, and are slightly outwardly spread corresponding to the arms 26 of the first form of the invention. They are thus inherently slightly yielding. However, they are urged towards each other by means of a small helical spring 56 surrounding a through bolt 57 to thus slightly reinforce such plates.

The plates 55 receive between them the tapered lugs 58 formed integrally with the lower contact member 37, and thus serve to cushion the final portion of the swing of the fuse and prevent jarring of the apparatus.

It is to be noted also that the lower end of the lugs 58 form abrupt shoulders against which the levers 51 bear when they are in their restrained position, as shown in Figure 4. The fuse is, therefore, prevented from moving downwardly under normal conditions. However, when the fuse blows, the lever 50 is no longer restrained by the fuse link and consequently it swings outwardly and allows the levers 51 to rock downwardly, thereby rocking the pivot points 52 outwardly and thus lowering the fuse. The lugs 45 of the upper contact 36 are thus disengaged from the retaining or latching springs 43 and the fuse rocks outwardly and downwardly, as previously described.

Figure 5:
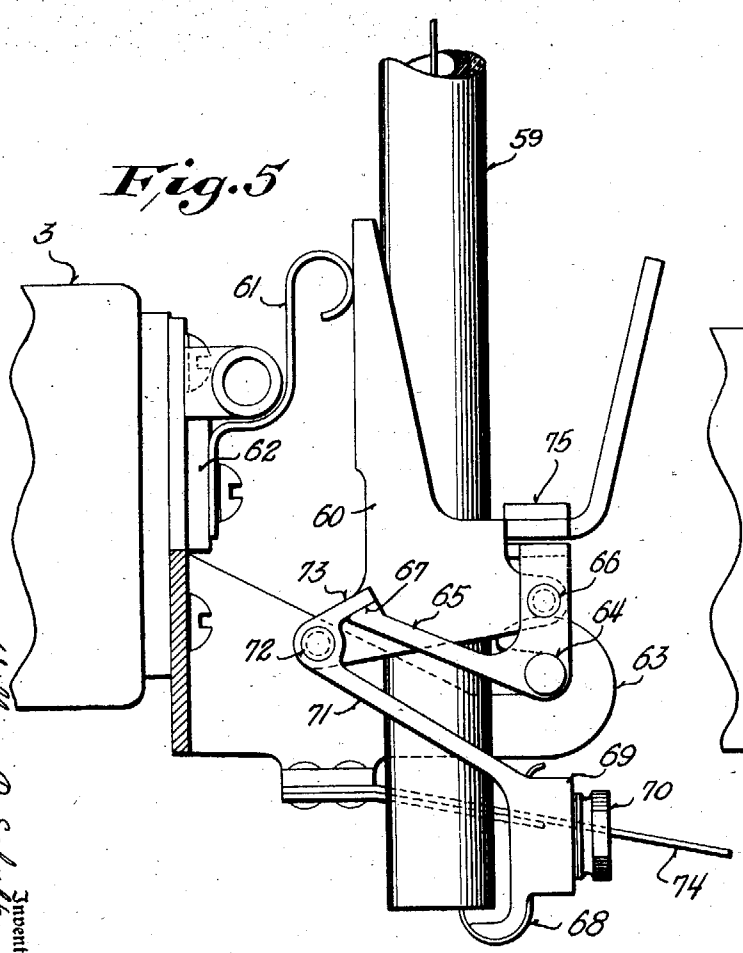
Figure 5 is a view of the lower portion of a fuse, showing a further form of the invention.

Referring to Figure 5 wherein another form of the invention is disclosed, it will be seen that the fuse tube 59 is provided with a lower contact member 60 engaged and urged outwardly by means of a contact spring 61 carried by the lower terminal member 62. A pair of hooked supporting arms 63 project outwardly from the lower terminal member and receive the fulcrum pins or pivot pins 64 of a pair of bell crank levers 65. These bell crank levers are pivotally connected, as indicated at 66, to the lower contact member 60 and are provided with cam faces 67.

The fuse link 68 is received by the fuse link receiving member 69 and locked by the screw or bolt 70, as previously described. This member 69 is provided with a pair of lever arms 71 pivoted, as indicated at 72, to the lower contact 66 and provided with extensions 73 which engage the cam faces 67 of the lever 65.

A pair of outwardly projecting springs 74 are carried by the stationary arms 63 and are located on opposite sides of the lower end of the fuse. These springs act as cushion members and are adapted to be struck by a transverse bar 75 carried by the fuse to thereby cushion the fuse and prevent excessive pressures being produced at the lower end of the swing of the fuse.

The contact spring 61 urges the fuse outwardly, but it is restrained by the lever mechanism consisting of the bell crank lever 65 and 71. However, when the fuse blows, the member 69 rocks upwardly a slight distance, thereby releasing the levers 65 and allowing the fulcrum points 66 to move outwardly beyond the fulcrum points 64, thus allowing the fuse to drop downwardly and release from its upper end. The fuse then swings outwardly, as previously described.

Figure 6:
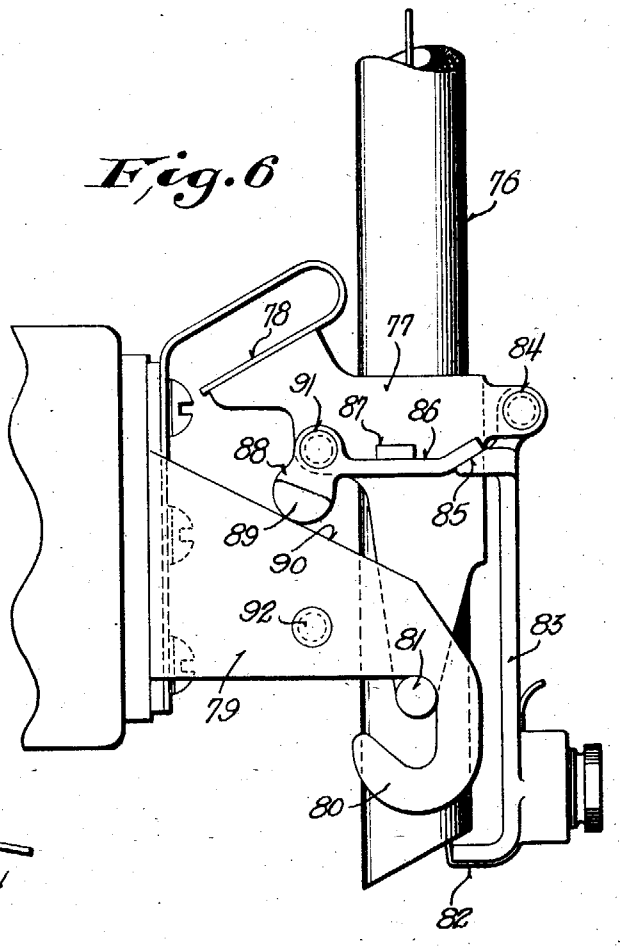
Figure 6 is a view corresponding to Figure 5, showing a still further form of the invention.

Referring to Figure 6 wherein a further form of the invention is shown, it will be seen that the fuse tube 76 is provided with a lower contact member 77 engaged by the flat portion 78 of a contact spring carried by the lower terminal member. A pair of outwardly projecting arms 79 are also carried by the lower terminal member and are provided with hooked ends 80 spaced a material distance below the lower edge of the main body of the members 79 to thus provide in effect a laterally opening, elongated slot within which the trunnion members or pivot pins 81 rigid with the lower contact 77 are carried. The fuse link 82 passes around the lower end of the fuse link receiving member or lever 83, which is pivoted, as indicated at 84, to the contact 77. It is provided with a cam face 85 which engages the free end of a lever 86 and holds such lever against a stop 87 carried by the member 77.

The lever 86 is provided with an extension 88 which carries a transverse bar 89. The bar 89 rests upon the slanting upper faces 90 of the member 79 and thus supports the fuse in the position shown.

However, when the fuse blows, the fuse link 82 releases the lever 83 and allows the lever 86 to rock about its pivot 91 in a clockwise direction, thus allowing the fuse to drop downwardly until the trunnions 81 or pivot pins rest upon the hooks 80. The spring 78 forces the fuse downwardly and outwardly and this spring, cooperating with the upper spring not shown but of a type similar to any of those previously described, starts the fuse towards its outward swing, the fuse completing its outward swing and being arrested at the limit of such swing in any suitable manner, as by having the fuse tube 76 strike against a transverse pin 92 carried by the member 79, or in fact cushioned or arrested in any manner desired, for example in a manner similar to any previously described.

It is to be noted also that the downwardly and outwardly inclined upper faces 90 of the member 79 urge the fuse outwardly as it drops downwardly. The lower portion of the transverse bar 89 is rounded and somewhat of a rolling action takes place between this member and the upper faces 90 of the outwardly projecting arms 79.

It will be seen that in all types of the invention that the expulsion fuse automatically releases itself when the fuse link is ruptured and allows the fuse to drop downwardly, thus disengaging itself from the upper catch and subsequently swinging outwardly to provide maximum separation between the upper end of the fuse and the upper contact.

It will be seen further that a very simple type of combined fuse and disconnecting switch has been provided which is automatic in its action, which is adapted for outdoor use, which prevents the accumulation or retention of water within the fuse tube, and which is thoroughly reliable in its operation.

It is to be distinctly understood, that any of the several types of fuses may be provided with a projecting lip similar to the lip 33 of Figure 1, so that such lip may be received by a fuse stick or pole in the usual manner, and that other combinations, not specifically illustrated, may be employed. Therefore, although this invention has been described in considerable detail, it is to be understood that such description is intended as illustrative rather than limiting, as the invention may be variously embodied and is to be interpreted as claimed.

We claim:

1. A fuse switch comprising an upper terminal member and a lower terminal member, a fuse having upper and lower contacts electrically connected to said terminal members, said fuse being supported from said terminal members and being provided with a fuse link, and means normally restrained from movement by said fuse link, said means holding said fuse in place and adapted to first lower said fuse when said fuse link is fused, to disengage said fuse from said upper terminal member, said fuse thereafter pivoting about its lower portion and swinging away from said upper terminal member.

2. A fuse assembly comprising upper and lower terminal members, a fuse having upper and lower contacts electrically connected to said terminal members, a fuse link carried by said fuse, lever mechanism for bodily lowering said fuse out of engagement with said upper terminal member, said lever mechanism normally holding said fuse in an elevated position and being normally held against movement by said fuse link, said fuse being pivotally supported adjacent its lower end and adapted to swing outwardly when disengaged from said upper terminal member.

3. An expulsion fuse assembly comprising upper and lower terminal members, a fuse latched to said upper terminal member and pivoted to said lower terminal member, said fuse having a tubular body portion closed at its upper end and open at its lower end, a fuse link within said tubular body portion, and means mechanically controlled by the tension of said fuse link for unlatching the upper portion when said fuse blows.

4. An expulsion fuse assembly comprising upper and lower terminal members, a fuse detachably secured to said upper terminal member and pivoted to said lower terminal member, said fuse having a tubular body portion closed at its upper end and open at it slower end, a fuse link within said tubular body portion extending outwardly from the open lower end of said tubular body portion, and latch means at the upper end of the tubular body portion mechanically controlled by the lower projecting portion of said fuse link for detaching said fuse from said upper terminal member.

5. An expulsion fuse assembly comprising upper and lower terminal members, a fuse detachably attached to said upper terminal member and pivotally supported from said lower terminal member, said fuse having a tubular body portion closed at its upper end and open at its lower end and provided with upper and lower contacts, upper and lower contact springs electrically connecting said upper and lower terminal members and said upper and lower contacts respectively, a fuse link carried within said tubular body portion and electrically joining said upper and lower contacts and projecting from the lower end of said tubular body portion, and latch mechanism at the upper end of the tubular body portion controlled by the lower projecting portion of said fuse link for detaching said fuse from said upper terminal member when said fuse blows, whereby said fuse rocks outwardly and downwardly from said upper terminal member when said fuse blows.

6. An expulsion fuse assembly comprising upper and lower terminal members, a fuse latched to said upper terminal member, said fuse having a tubular body portion closed at the top and open at the bottom, a fuse link within said tubular body portion and extending outwardly through the lower open end thereof, said lower terminal member constituting a pivot support, a lever pivoted adjacent its upper end to said body portion and pivotally resting in the pivot support of said lower terminal member and normally approximately paralleling said body portion, the lower end of said link extending over the lower end of said lever and normally holding said lever in place, and means carried by said lever for clamping said link to said lever.

7. A fuse switch comprising upper and lower line terminals, a spring holding means extending from one of said terminals, bearing means associated with the other terminal at a predetermined distance from said holding means, a cartridge having terminal engaging elements, one of which is fixed and adapted to springingly cooperate with said spring extension and the other with said bearing means and which latter element is movably related to the cartridge, a fuse link associated with the cartridge and means whereby said link when in normal connected position holds said movable terminal so as to be separated from the fixed terminal a distance greater than said predetermined distance, and the articulation between the said movable terminal and the cartridge being such as to shorten said distance and release the upper terminal engaging element from the said extension when said fuse blows.

8. In a fuse switch embodying spaced line terminals, a tubular fuse holder, a fuse link in said holder held at one end against endwise movement relative to said holder, a lever carried by said holder engaging the opposite end of said fuse link, cooperable means on said lever and one of said line terminals providing a hinged mounting for said fuse holder, the other of said line terminals being resilient and adapted to exert an endwise force on said fuse holder.

9. A fuse unit comprising in combination a tube, a terminal closing the upper end of the tube and providing at its upper end a shoulder whereby the upper end of the tube may be held against lateral motion, a metallic member secured to the tube adjacent its lower end, a supporting link secured pivotally to the metallic member, a fuse link in the tube connected at its upper end to said terminal, and by anchorage of its lower end controlling the angular position of the supporting link with respect to the tube, said supporting link having laterally spaced rotary bearing portions for cooperation with spaced stationary bearings to provide stable rotary support.

10. A fuse unit comprising in combination a tube, a termnial closing the upper end of the tube and providing at its upper end a shoulder whereby the upper end of the tube may be held against lateral motion, a metallic member secured to the tube adjacent its lower end and having a bracket arm extending laterally with respect to the tube, a bell crank lever having one arm pivotally connected to said bracket arm and having a free arm, said bell crank lever having laterally spaced bearing members forming a rotary support for the bell crank, a fusible link in the tube electrically connecting said terminal and said bell crank and mechanically restraining the free arm of said bell crank.

11. In a cutout switch having spaced terminals, a tube, a contact on the tube engaging one of the terminals, a second contact on said tube pivotally supporting the tube from the other of said terminals, said second contact including a lever having a pin joint connection with the tube and a pivotal connection with the last mentioned terminal to provide a two-joint pivot, and means for holding said lever against pivotal movement relative to said tube and for establishing an arc in said tube, said means including a tensioned fuse link establishing a circuit through said tube.

12. In a cutout switch having spaced terminals, a tube, a contact on the tube engaging one of said terminals, a second contact on said tube pivotally supporting the tube from the other of said terminals, said tube being bodily movable relative to said pivot for withdrawing the first mentioned contact from engagement with said one terminal, and means for holding said tube against movement relative to said pivot for drawing an arc in said tube, said means including a tensioned fuse for establishing a circuit through said tube.

13. In a disconnecting switch having spaced terminals, a tube having at one end an upper contact latched to one of said terminals, and having at the other end a lower contact pivoted on the other of said terminals, said last mentioned end being movable relative to said pivot thereby to withdraw the upper contact from the latch, and a flexible conductor in said tube connecting said contacts and holding said tube against movement relative to said pivot, said conductor including a separable portion.

14. In combination, an upper line terminal, a lower line terminal, a fuse tube adapted to be closed at its upper end, a coupling between the upper line terminal and the upper end of the fuse tube, comprising a latch preventing the upper end of the tube from swinging out of engagement therewith but allowing endwise disengagement of the tube, a coupling between the lower end of the tube and the lower line terminal providing for free pivotal motion of the tube on said lower terminal when the upper coupling is disengaged, and comprising guiding means allowing for endwise sliding of the tube relative to the lower line terminal to cause disengagement of the upper coupling, and means including a fusible link in the tube for holding the tube against endwise sliding movement relative to the lower line terminal.

15. An expulsion fuse assembly comprising upper and lower terminal members, a latch mounted on the upper terminal member, a fuse held by said latch to said upper terminal member and pivoted to said lower terminal member, said fuse having a tubular body portion closed at its upper end and open at its lower end, a fuse link within said tubular body portion, and means mechanically controlled by the tension of said fuse link for releasing the upper portion of the fuse from said latch when said fuse blows.

16. In a circuit breaker, an expulsion tube of insulating material, conducting means fixedly attached on the tube, insulated supporting means for said tube, latch means on one of said insulated supporting means for engaging the conducting means at one end of said tube, plural pivot means associated with the conducting means at the other end of said tube for pivotally mounting said tube upon the other of said insulated supporting means, link means connecting said pivot means, and means to maintain said link means in fixed relation to said tube during closing movement of said tube but operable by an overload current to disestablish said fixed relation and to cause circuit opening within said tube.

17. An expulsion fuse assembly comprising upper and lower terminal members, a fuse latched to said upper terminal member and pivotally supported by said lower terminal member, said fuse having a tubular body portion closed at its upper end by a cap and open at its lower end for the discharge of substantially all of the gases downwardly out of the tubular body, a fuse link within said tubular body portion and means movable as an incident to the blowing of the fuse link to effect unlatching of the upper portion when the fuse blows.

18. In combination, a stationary contact terminal, a drop out fuse including a closed top tube engageable therewith, a latch for latching the drop out fuse to said contact terminal, and a spring operable upon blowing of the fuse to release said latch and extend the arc.

19. In a drop out fuse assembly, a stationary contact, a pivoted fuse having an open lower end and a cap at the upper end, a stationary contact for engaging said cap, said tube being provided with a ferrule at its lower end, and a pivoted mounting to permit the tube to swing outwardly and downwardly to disconnect said cap from said stationary contact when the fuse link melts, and a resiliently stressed fuse link operating to interrupt current flow through the device before the cap leaves engagement with the stationary contact whereby arcing between the stationary contact and the cap is avoided.

20. The expulsion fuse assembly of claim 3 further characterized by said means including engaging latching portions, one of which is at the upper end of the tubular body portion and is movable in the longitudinal direction of the tubular body portion to effect ultimate movement out of register and engagement of said latching portions upon blowing of the link.

21. The fuse assembly of claim 15 further characterized by said means including a part of the fuse movable longitudinally relative to the axis thereof in effecting release of the latch.

22. The expulsion fuse assembly of claim 4 further characterized by said upper end being movable to detach the tubular body portion from said upper terminal and said means effecting movement of said upper end upon rupture of said fuse link.

23. The expulsion fuse assembly of claim 5 further characterized by said upper contact being movable for detaching said fuse from said upper terminal and said mechanism effecting such movement of said upper contact.

24. The expulsion fuse assembly of claim 17 further characterized by said means including a part movable longitudinally relative to the fuse axis in the releasing of the latched fuse.

25. The combination of claim 18 further characterized by said latch being associated with a closure member at the upper end of said tube and by said tube being swingable relative to the longitudinal axis of said fuse in the fuse opening operation.

26. The drop out fuse assembly of claim 19 further characterized by said cap being movable in the longitudinal direction of said tube to effect said swinging motion of said tube.

27. The expulsion fuse assembly of claim 3 further characterized by the upper terminal member being channeled and provided with a concealed latching abutment, and said means including a latching part on the upper end of the tubular body portion disengageable upon movement in the direction of the length of the tubular body portion when the fuse blows and whereby said tubular body portion is free to swing on its pivot outwardly into a position extending below said terminal member.

28. The expulsion fuse assembly of claim 3 further characterized by a manually engageable handle connected to the upper end of said tubular body portion for effecting manual release of the fuse from the upper terminal member without disturbing said fuse link.

29. The combination of claim 18 in which the drop out fuse is pivotally mounted on a lower contact terminal and is swingable through an arc of approximately 180° after movement of a part of the fuse longitudinally relative to the axis thereof.

30. The fuse assembly of claim 17 further characterized by the upper terminal member having associated with it a channeled portion for receiving the upper end of the tubular body portion and in which the said upper end is adapted to be closely confined and further by said means including a latching member at the upper end of the tubular body portion for latching connection of the upper end of the fuse in said channeled portion, and which connection is released upon blowing of the fuse.

31. The expulsion fuse assembly of claim 17 further characterized by the upper terminal member being of channeled construction and by the upper end of the tubular body portion including a cap and an associated latching element, said channeled member having therein means arranged to be engaged by said latching element upon movement of said cap upwardly into the channeled member whereby said capped upper end of the fuse is held in telescoping cooperation with the channeled member to aid in protecting the fuse from the natural elements.

32. The expulsion fuse assembly of claim 17 further characterized by the upper terminal member including a closed top channeled protective part having latching means therein and further by said upper end of the fuse body portion being provided with a cap for telescoping said channeled part and closely confined thereby with said fuse latched to said latching means in the channeled part, said movable means cooperating through the upper end of the fuse to effect disengagement of said latching means upon blowing of the link whereby said upper end of the fuse is ejected from said channeled terminal member part.

33. An expulsion fuse assembly comprising upper and lower terminal members, a fuse latched to said upper terminal member and pivotally supported by said lower terminal member, said fuse having a tubular body portion closed at its upper end against the passage of a fuse link therethrough and open at its lower end for the expulsion of substantially all the gases downwardly through the fuse, a fuse link within said tubular body portion and means movable as an incident to the blowing of the fuse link to effect unlatching of the upper portion of the fuse when the fuse blows, said upper terminal member being channeled to receive the upper end of the tubular body portion and in which the said upper end is adapted to be closely confined and further by said means including spring means in the channel terminal, said channeled terminal member and closed upper end of the fuse being automatically disengageable from latched cooperation upon blowing of the fuse link and said closed end being then movable outwardly of the channeled terminal member under the influence of said spring means whereby the fuse thereafter swings downwardly about its pivot to a blown position.

34. An expulsion fuse assembly comprising upper and lower terminal members, a fuse detachably secured to said upper terminal member and pivoted to said lower terminal member, said fuse having a tubular body portion closed at its upper end against the passage of a fuse link therethrough and open at its lower end for the expulsion of substantially all the gases downwardly through the fuse, a fuse link within said tubular body portion extending outwardly from the open lower end of the tubular body portion, and latch means at the upper end of the tube mechanically controlled by the lower projecting portion of said fuse link for detaching said fuse from said upper terminal member, said closed end of said fuse having a part cooperating with said latch means and said upper terminal member including a protective hood for said latch and for said closed end of the fuse, disengagement of said latch means being effected at said closed end upon blowing of said fuse link.

35. The fuse assembly of claim 34 further characterized by spring means in the hood for ejecting the capped upper end of the fuse from the hood upon the unlatching of said latch means.

36. The drop out fuse assembly of claim 19 further characterized by the stationary contact including a closed top channeled part for receiving and closely confining the capped end of the fuse, and latch means in the channeled part cooperating with a portion of the tube and said cap and disengageable upon movement of said portion when said link is blown.

37. The drop out fuse assembly of claim 19 further characterized by the stationary contact including a hood for receiving and closely confining the capped end of the fuse and wherein said capped end is latched and automatically releasable upon blowing of the link, said hood also having spring means for ejecting the capped end of the fuse outwardly upon disengagement of the latch so that the fuse may then swing downwardly on its pivotal mounting.

38. An expulsion fuse assembly comprising upper and lower terminal members, a fuse latched to said upper terminal member and pivotally supported by said lower terminal member, said fuse having a tubular body portion closed at its upper end against the passage when assembled of a fuse link therethrough and open at its lower end for the expulsion of substantially all the gases downwardly out of the fuse, a fuse link within said tubular body portion and means movable as an incident to the blowing of the fuse link to effect unlatching of the upper portion of the fuse when the fuse blows, said upper terminal member housing and protecting catch means cooperating with the upper end of said fuse body portion to latch said fuse to said upper terminal member and said fuse being provided with a part movable in the direction generally of the length of the fuse to disengage the fuse from said catch means.

39. The combination of claim 18 further characterized by the fuse being of the expulsion open bottom type with a link therein and by the fuse tube being pivotally supported, the stationary contact terminal being also channeled to receive the closed top of the fuse in which said closed top is closely confined when the fuse is in operative position, said closed top being movable outwardly of said channeled contact terminal after disengagement of said latch whereby said fuse thereafter swings downwardly about its pivot to an open position.

WILLIAM O. SCHULTZ.
ALWIN G. STEINMAYER.